Patented Oct. 30, 1951

2,572,845

UNITED STATES PATENT OFFICE 2,572,845

ALKYLTHIOSULFENYL DITHIOCARBAM-
ATES AND PREPARATION THEREOF

Chester M. Himel and Lee O. Edmonds, Bartles-
ville, Okla., assignors to Phillips Petroleum
Company, a corporation of Delaware No Drawing. Application November 8, 1948,
Serial No. 59,025

15 Claims. (Cl. 260—567)

1

This invention relates to new compositions and their manufacture. In one aspect this invention relates to alkylthiosulfenyl dithiocarbamates and preparation thereof.

An object of this invention is to provide new and novel compositions.

Another object is to provide alkylthiosulfenyl dithiocarbamates as new compounds.

Another object is to provide a process for the manufacture of alkylthiosulfenyl dithiocarbamates.

Other objects will be apparent, to one skilled in the art, from the accompanying discussion and disclosure.

In accordance with our invention we have prepared new and novel chemical compounds, alkylthiosulfenyl dithiocarbamates, having a composition in accordance with the following structural formula:

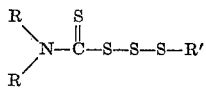

wherein each R is selected from the group consisting of hydrogen, alkyl, aryl and aralkyl radicals, having not more than 10 carbon atoms, and radicals which together with the nitrogen form a heterocyclic ring, preferably containing 4 to 5 carbon atoms, but with not more than one R being hydrogen and wherein R' is selected from the group consisting of primary, secondary and tertiary alkyl radicals containing not more than 10 carbon atoms. Our preferred process for producing the compounds of our invention is from the interaction of alkylthiosulfenyl halides with the salts of N-substituted dithiocarbamic acids. These products have numerous potential uses, such as rubber vulcanization accelerators, fungicides, intermediates for the production of valuable organic chemicals, and the like.

In the practice of a preferred embodiment of our invention we prepare our new compositions by slowly adding an alkylthiosulfenyl halide, preferably in solution in a chemically inert organic solvent, to an aqueous solution of a suitable salt of an N-substituted dithiocarbamic acid, the system being well agitated during the addition. The resulting reaction mixture is then stirred usually from 3 to 10 minutes after which the product is recovered.

2

The dithiocarbamates employed in the practice of our invention are those having a composition in accordance with the following structural formula:

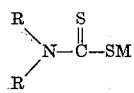

wherein each R is selected from the group consisting of hydrogen, alkyl, aryl, aralkyl radicals, having not more than 10 carbon atoms, and radicals which together with the nitrogen form a heterocyclic ring, preferably containing 4 to 5 carbon atoms, but with not more than one R being hydrogen, and wherein M is selected from the group consisting of alkali metals and alkaline earth metals, preferably sodium or potassium.

The alkylthiosulfenyl halides employed in this invention are compounds having the general formula: R'—S—S—X wherein R' is selected from the group consisting of primary, secondary and tertiary alkyl radicals containing not more than 10 carbon atoms and wherein X is selected from the group consisting of chlorine, bromine and iodine.

When employing an organic solvent in the introduction of the alkylthiosulfenyl halide to the reaction as already described, we prefer as such a solvent any low-boiling saturated hydrocarbon such as normal pentane, isopentane, light saturated naphthas, mixtures of low-boiling inert hydrocarbons, and the like, boiling in the range of −10 to 60° C., although higher boiling solvents may be advantageously employed in some cases, as where higher molecular weight reactants are employed. We often prefer to dissolve the alkylthiosulfenyl halide in the selected organic solvent, in an amount of from 0.25 to 2 moles per liter of solvent. Temperatures most usually applicable to the practice of our invention are within the range of from about −10 to 60° C., although more generally we prefer to operate in a range of from 10 to 40° C. Pressures are generally atmospheric although higher pressures may be employed, if desired. In general, it is preferable to conduct the reaction in a vessel with a reflux condenser. By so operating, the temperature is easily controlled at a desired level, and also a convenient means of agitation for the system is thereby provided, by the ebullition of the low-boiling inert solvent. It is to be understood that it is within the scope of our invention to conduct the product-forming step of our process in the absence of an inert organic solvent, and that we employ this solvent as a means for controlling the reaction, to proceed at a rate conducive to producing optimum yields of desired product, in view of the highly active nature of the alkylthiosulfenyl halides.

In another embodiment of our invention we may prepare our new compounds in a single inert solvent medium utilizing a solvent of the type already described. In the practice of this embodiment the reactants may be introduced to the reaction system in any desired manner. For example, solid N-substituted dithiocarbamate may be introduced to an alkylthiosulfenyl halide in solution in the inert organic solvent in a desired proportion, at any desired rate, or the halide in solution in the inert organic solvent may be introduced to the N-substituted dithiocarbamate when suspended in another portion of the same organic solvent.

We prefer to employ equi-molar proportions of reactants in our process, although if desired, an excess of a reactant may be used.

Our invention is illustrated by the following examples. The reactants, their proportions, and other specific ingredients are presented as being typical and should not be construed to limit the invention unduly.

*Example I*

A solution of sodium dimethyl dithiocarbamate was prepared by adding 76 parts by weight of carbon disulfide to a stirred reaction mixture comprising 45 parts by weight of dimethyl amine and 40 parts by weight of sodium hydroxide in 20 per cent aqueous solution. The temperature was maintained at or near 0° C. during the addition.

The solution was warmed to 25° C., covered with a 200 ml. layer of isopentane and refluxed during the addition of a solution of 157 parts by weight of tert-butylthiosulfenyl chloride in 1200 ml. isopentane. After about five minutes the isopentane layer was separated and washed with water. The solvent was then separated from the N,N-dimethyl-S-tert-butylthiosulfenyl dithiocarbamate product by distillation. A yield of 90 per cent of theoretical of a light, greenish yellow, syrupy liquid product was obtained which had a refractive index, $n_D^{20}$, of 1.6062. A sample was analyzed for nitrogen with the following results.

| Theoretical | Found |
|---|---|
| 5.8 | 5.90 |
|  | 5.95 |

*Example II*

A solution of 157 parts by weight of tert-butylthiosulfenyl chloride in isopentane was added to a stirred, refluxing mixture of 171 parts by weight of sodium diethyl dithiocarbamate in water to which a small amount of isopentane had been added. After about five minutes the isopentane layer was removed and washed with water. N,N-diethyl-S-tert-butylthiosulfenyl dithiocarbamate was then recovered by distilling off the isopentane. A yield of 90 per cent of theoretical of a light, greenish yellow, syrupy liquid product was obtained which had a refractive index, $n_D^{20}$, of 1.5958.

*Example III*

N,N-di-n-propyl-S-tert-butylthiosulfenyl dithiocarbamate was prepared by addition of an isopentane solution of tert-butylthiosulfenyl chloride to an equi-molar amount of sodium di-n-propyl dithiocarbamate in aqueous solution with added isopentane. A yield of 90 per cent of theoretical of a light, greenish yellow, syrupy liquid product, was obtained which had a refractive index, $n_D^{20}$, of 1.5820.

As will be evident to those skilled in the art, various modifications of this invention can be made, or followed, in the light of the foregoing disclosure and discussion, without departing from the spirit or scope of the disclosure or from the scope of the claims.

We claim:

1. A process for the preparation of an alkylthiosulfenyl dithiocarbamate having a composition in accordance with the structural formula:

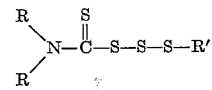

wherein each R is a radical selected from the group consisting of hydrogen, and an alkyl containing not more than 10 carbon atoms, but not more than one R being hydrogen and wherein R' is selected from the group consisting of primary, secondary and tertiary alkyl radicals containing not more than 10 carbon atoms, said method comprising reacting an alkylthiosulfenyl halide having a composition in accordance with the structural formula, R'—S—S—X wherein R' is as above described, and wherein X is a halogen selected from the group consisting of chlorine, bromine and iodine, with a dithiocarbamate having a composition in accordance with the following structural formula:

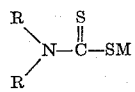

wherein each R is as above described and wherein M is selected from the group consisting of alkali and alkaline earth metals.

2. The process of claim 1 wherein said halide is dissolved in an inert organic solvent and is added to an aqueous solution of said dithiocarbamate.

3. The process of claim 2 wherein said solvent has a boiling point within the range of 10 to 40° C. and the reaction is conducted in the refluxing solvent.

4. The process of claim 3 wherein the reactants are introduced in equi-molar proportions.

5. As a new composition of matter an alkylthiosulfenyl dithiocarbamate having a composition in accordance with the following structural formula:

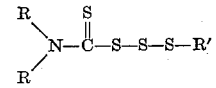

wherein R is a radical selected from the group consisting of hydrogen, and an alkyl containing not more than 10 carbon atoms, but with not more than one R being hydrogen and wherein R' is an alkyl radical containing not more than 10 carbon atoms.

6. As a new composition of matter, N,N-di-n-propyl-S-tert-butylthiosulfenyl dithiocarbamate.

7. As a new composition of matter, N,N-diethyl-S-tert-butylthiosulfenyl dithiocarbamate.

8. As a new composition of matter, N,N-dimethyl-S-tert-butylthiosulfenyl dithiocarbamate.

9. A process for the preparation of an alkylthiosulfenyl dithiocarbamate having a composition in accordance with the structural formula:

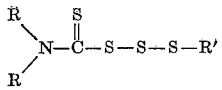

wherein each R is a radical selected from the group consisting of hydrogen, and an alkyl containing not more than 10 carbon atoms, but not more than one R being hydrogen and wherein R' is selected from the group consisting of primary, secondary and tertiary alkyl radicals containing not more than 10 carbon atoms, said method comprising reacting an alkylthiosulfenyl halide having a composition in accordance with the structural formula, R'—S—S—X wherein R' is as above described and wherein X is a halogen selected from the group consisting of chlorine, bromine and iodine, with a dithiocarbamate having a composition in accordance with the following structural formula:

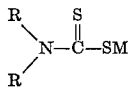

wherein each R is as above described and wherein M is selected from the group consisting of alkali and alkaline earth metals and effecting said reacting in a chemically inert organic solvent at a temperature within the range of −10 to 60° C., and recovering alkylthiosulfenyl dithiocarbamate product from the resulting admixture.

10. A process for the preparation of an alkylthiosulfenyl dithiocarbamate having a composition in accordance with the structural formula:

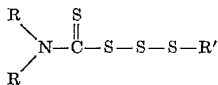

wherein each R is a radical selected from the group consisting of hydrogen, and an alkyl containing not more than 10 carbon atoms, but not more than one R being hydrogen and wherein R' is selected from the group consisting of primary, secondary and tertiary alkyl radicals containing not more than 10 carbon atoms, said method comprising reacting an alkylthiosulfenyl halide having a composition in accordance with the structural formula, R'—S—S—X, wherein R' is as above described and wherein X is a halogen selected from the group consisting of chlorine, bromine and iodine, with a dithiocarbamate having a composition in accordance with the following structural formula:

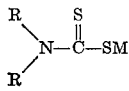

wherein each R is as above described and wherein M is selected from the group consisting of alkali and alkaline earth metals, effecting said reacting by dissolving said halide in an inert organic solvent having a boiling point within the range of 10–40° C. and gradually adding the resulting solution to an aqueous solution of said dithiocarbamate under solvent refluxing conditions, and thereafter recovering alkylthiosulfenyl dithiocarbamate product from the resulting reaction mixture.

11. A process for the preparation of N,N-dimethyl-S-tert-butylthiosulfenyl dithiocarbamate comprising reacting sodium dimethyl dithiocarbamate with tert-butylthiosulfenyl chloride, effecting said reacting by dissolving said tert-butylthiosulfenyl chloride in a chemically inert organic solvent and gradually adding the resulting solution to an aqueous solution of said sodium dimethyl dithiocarbamate maintained at a temperature within the limits of 10–40° C., and thereafter recovering N,N-dimethyl-S-tert-butylthiosulfenyl dithiocarbamate product from the reaction mixture.

12. A process for the preparation of N,N-diethyl-S-tert-butylthiosulfenyl dithiocarbamate comprising reacting sodium diethyl dithiocarbamate with tert-butylthiosulfenyl chloride, effecting said reacting by dissolving said tert-butylthiosulfenyl chloride in a chemically inert organic solvent and gradually adding the resulting solution to an aqueous solution of said sodium diethyl dithiocarbamate maintained at a temperature within the range of 10–40° C., and thereafter recovering N,N-diethyl-S-tert-butylthiosulfenyl dithiocarbamate product from the reaction mixture.

13. The process of claim 12 wherein said organic solvent is a pentane.

14. A process for the preparation of N,N-di-n-propyl-S-tert-butylthiosulfenyl dithiocarbamate comprising reacting sodium di-n-propyl dithiocarbamate with tert-butylthiosulfenyl chloride, effecting said reacting by dissolving said tert-butylthiosulfenyl chloride in a chemically inert organic solvent and gradually adding the resulting solution to an aqueous solution of said sodium di-n-propyl dithiocarbamate maintained at a temperature within the limits of 10–40° C., and thereafter recovering N,N-di-n-propyl-S-tert-butylthiosulfenyl dithiocarbamate product from the reaction mixture.

15. The process of claim 14 wherein said organic solvent is a pentane, wherein equi-molar proportions of the reactants are reacted, and wherein said aqueous solution is covered with a layer of said organic solvent prior to the introduction of said tert-butylthiosulfenyl chloride to said aqueous solution.

CHESTER M. HIMEL.
LEE O. EDMONDS.

REFERENCES CITED

The following references are of record in the file of this patent:

UNITED STATES PATENTS

| Number | Name | Date |
| --- | --- | --- |
| 1,809,457 | Teppema | June 9, 1931 |
| 2,024,613 | Teppema | Dec. 17, 1935 |
| 2,368,515 | Blake | Jan. 30, 1945 |
| 2,390,713 | Hunt | Dec. 11, 1945 |

OTHER REFERENCES

Rheinboldt, "Ber. deut. Chem.", vol. 72 (1939) page 659.